No. 710,274. Patented Sept. 30, 1902.
E. HORTON.
TIRE FOR WHEELS.
(Application filed May 28, 1902.)
(No Model.)
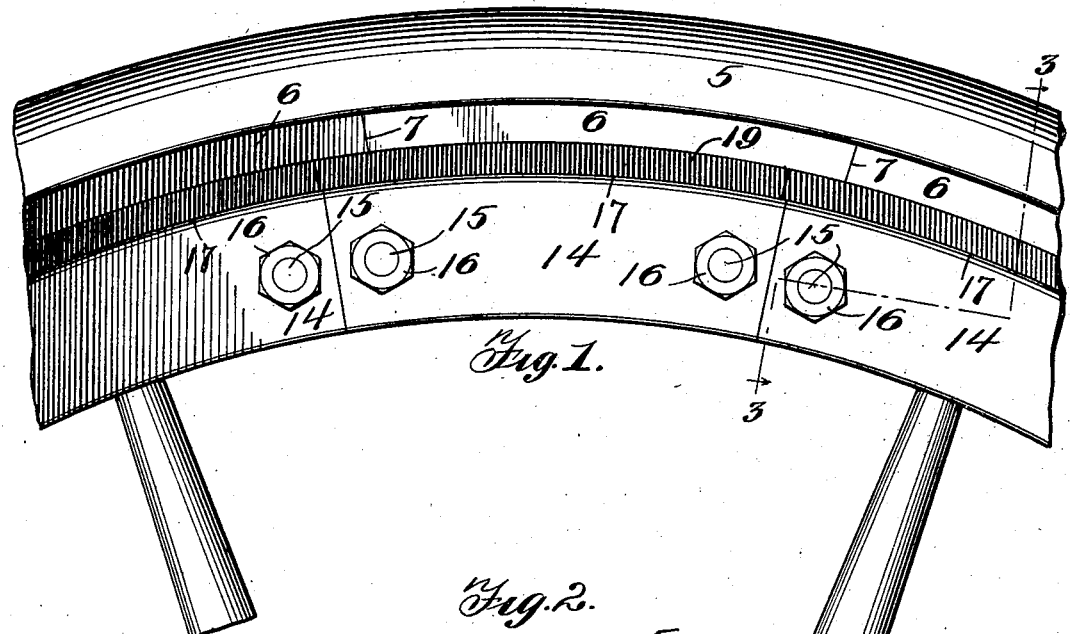
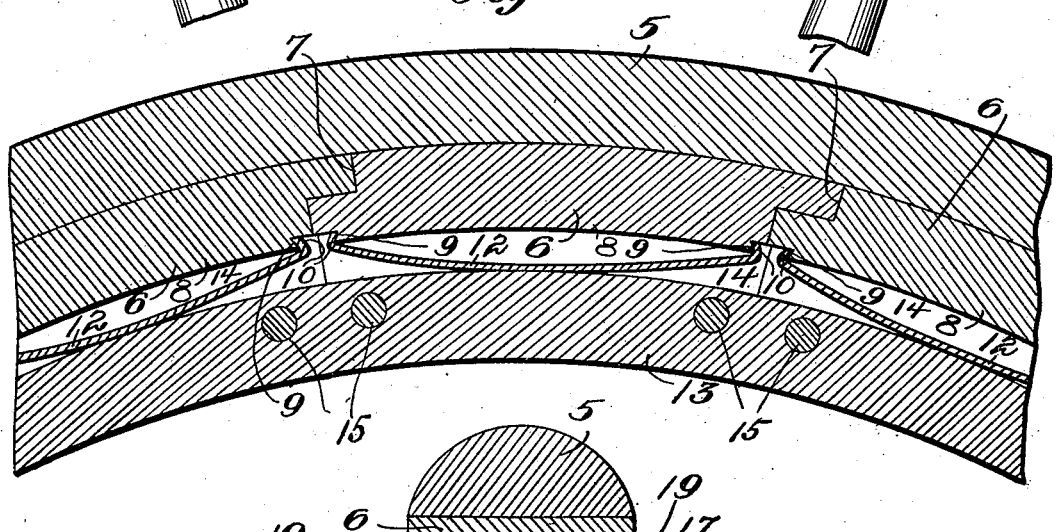
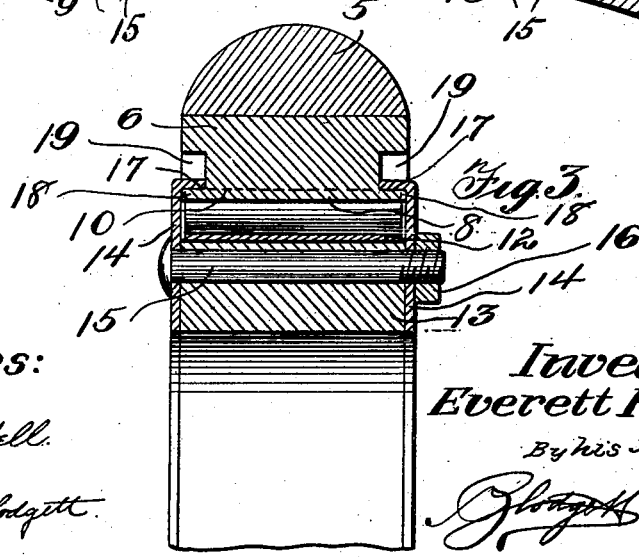
Witnesses:
F. G. Campbell.
Frances E. Blodgett.
Inventor:
Everett Horton.
By his Attorneys:
Blodgett + Peck

UNITED STATES PATENT OFFICE.

EVERETT HORTON, OF BRISTOL, CONNECTICUT.

TIRE FOR WHEELS.

SPECIFICATION forming part of Letters Patent No. 710,274, dated September 30, 1902.

Application filed May 28, 1902. Serial No. 109,313. (No model.)

*To all whom it may concern:*

Be it known that I, EVERETT HORTON, a citizen of the United States, residing at Bristol, in the county of Hartford and State of Connecticut, have invented certain new and useful Improvements in Tires for Wheels, of which the following is a specification.

My invention relates to tires for wheels; and it has for its object the provision of an improved tire which will be both durable and resilient and will readily conform to inequalities or obstructions in the road-bed.

Further objects of the invention will be set forth in the detailed description which now follows.

In the accompanying drawings, Figure 1 is a side elevation of a portion of the rim of a vehicle-wheel constructed in accordance with my invention. Fig. 2 is a longitudinal vertical section of Fig. 1, and Fig. 3 is a transverse vertical section upon line 3 3 of Fig. 1.

Like numerals designate similar parts throughout the several views.

Designated by the numeral 5 is a tire made of any suitable flexible material, which encircles a supplemental rim, hereinafter described, of the wheel, and it is in the peculiar construction of this supplemental rim that my invention resides. The tire-bearing portion or supplemental rim is constructed of segments 6, each provided at its ends with a section of a lap-and-butt joint, as at 7, the under surfaces of said segments having inwardly-inclined transverse projections 8, over which, as at 9, are fitted the flanges 10 of bow-shaped springs 12, the bow portions of which bear upon the usual felly 13, which receives the spokes. To insure this sectional supplemental rim, over which the tire is placed, against lateral displacement and to secure the same in position, plates 14 are provided on each side of the felly 13. Each of these plates has a laterally-projecting flange 17, and the plates are secured to the felly by headed bolts 15 and nuts 16, said bolts passing through perforations in the plates and felly, as shown in Figs. 1 and 3. Each segment or section of the supplemental rim is provided with a longitudinal groove 19 and with a longitudinal rib or flange 18, over which the flanges 17 of plate 14 are placed, by which construction movement of the plates against the pressure of the springs 12 is permitted toward and from the hub of the wheel when the latter meets with an obstruction in the roadway or encounters an uneven surface thereof. Furthermore, by the use of the overlapping joints 7 at the ends of the segments 6 the pressure against the tread is taken up to a greater or less extent by the adjacent segments, for when the resilient tire 5 is forced inward over one of said segments the others will by the interlocking construction described aid it in resisting the pressure and the springs will yield, and thus prevent the usual jarring effect and the noise incident to the employment of ordinary wheels.

From the above description it will be seen that a wheel is provided which is adapted for use on carriages and other vehicles where pneumatic tires have been found to be impractical, owing to their liability to puncture, and by the construction illustrated and described I am able to produce a tire that will ride as easily as the pneumatic tire, that will readily yield to obstacles, and one that cannot be disabled by puncturing.

I do not limit myself to the exact construction shown, for, if desired, the springs 12 may be differently disposed, and other changes may be made without departure from the invention.

Having thus described my invention, what I claim is—

1. In a resilient tire for wheels, the combination, with an inner rim, of a segmental rim composed of segments having longitudinal ribs and grooves on their sides; springs interposed between said rims; and plates carried by the inner rim, and having flanges fitting over the ribs formed upon the segmental rim and entering the longitudinal grooves thereof.

2. In a tire or rim for wheels, the combination with an outer rim, composed of segments having grooves and ribs on their sides, of an inner rim; springs between said rims; plates carried by the inner rim and having flanges which fit over the ribs of the outer rim and enter the grooves thereof, and a tire placed over the outer rim.

3. In a tire or rim for wheels, the combination, with a segmental rim having longitudinal grooves in the side of each segment thereof, of an inner rim; plates secured to said inner rim and having flanges which enter said grooves and are limited in movement by the walls thereof; and springs secured to the segments and located between the segmental rim and the inner rim.

4. In a tire or rim for wheels, the combination, with a series of longitudinally-grooved segments united by overlapping joints, of springs carried by each of said segments; an inner rim against which said springs bear; and plates secured to the inner rim and having flanges entering the grooves of the segments and limited in their movement by the walls of said grooves.

5. In a wheel, the combination, with a felly, of flanged plates secured to said felly; a series of segments having end projections and longitudinal grooves; springs carried by said segments and bearing against the felly; and a resilient tire surrounding the segments.

6. In a wheel, the combination, with the felly thereof, of plates having inwardly-projecting flanges, interlocking segments having grooves to receive said flanges; bow-springs carried by said plates, and bearing against the felly; and a tire surrounding said segments.

7. In a wheel, the combination, with the felly thereof; of plates having inwardly-projecting flanges secured to said felly; longitudinally-grooved, interlocking segments having undercut projections; bow-springs having flanges engaging said projections; and a tire surrounding said segments.

In testimony whereof I affix my signature in presence of two witnesses.

EVERETT HORTON.

Witnesses:
CARLYLE F. BARNES,
FREDERICK A. HORTON.